United States Patent
Tung (10) Patent No.: US 6,364,562 B1
(45) Date of Patent: Apr. 2, 2002

(54) TILTABLE SUNSHADE

(76) Inventor: Benson Tung, No. 587, Chien-Gong Road, San-Min, Kaohsiung (TW)

(*) Notice: Subject to any disclaimer, the term of this patent is extended or adjusted under 35 U.S.C. 154(b) by 0 days.

(21) Appl. No.: 09/758,563

(22) Filed: Jan. 11, 2001

(51) Int. Cl.$^7$ .................. A45B 17/00; F16C 11/10
(52) U.S. Cl. .................. 403/93; 403/96; 135/20.3; 135/74
(58) Field of Search ............... 135/20.3, 74; 403/92, 403/93, 96

(56) References Cited

U.S. PATENT DOCUMENTS

| | | | | |
|---|---|---|---|---|
| 2,462,560 A | * | 2/1949 | Schmidt | 135/74 |
| 3,419,295 A | * | 12/1968 | Small | 135/20.3 X |
| 4,877,045 A | * | 10/1989 | Lin | 135/74 X |
| 5,265,969 A | * | 11/1993 | Chuang | 403/94 |
| 6,202,659 B1 | * | 3/2001 | Sachs | 135/20.3 |

FOREIGN PATENT DOCUMENTS

| | | | | |
|---|---|---|---|---|
| CH | 286294 | * | 2/1953 | 135/74 |
| DE | 2529240 | * | 1/1976 | 135/74 |

* cited by examiner

Primary Examiner—Robert Canfield
(74) Attorney, Agent, or Firm—Alan Kamrath; Rider, Bennett, Egan & Arundel, LLP (57) ABSTRACT

A tilt device for a sunshade comprises an upper sleeve having an upper end securely connected to an upper end of an upper support tube of a sunshade and a lower sleeve having a lower end securely connected to a lower end of a lower support tube of the sunshade. A lower end of the upper sleeve comprises several positioning grooves. The lower end of the upper sleeve is pivotally connected to the upper end of the lower sleeve. A push member is biased to selectively engage with one of the positioning grooves of the upper sleeve. The push member moves downward and inward when it is pushed inward.

9 Claims, 9 Drawing Sheets

TILTABLE SUNSHADE

BACKGROUND OF THE INVENTION

1. Field of the Invention

The present invention relates to a tiltable sunshade, and more particularly to a sunshade that can be adjusted to be retained in one of a plurality of tilt positions.

2. Description of the Related Art

Figure 8:
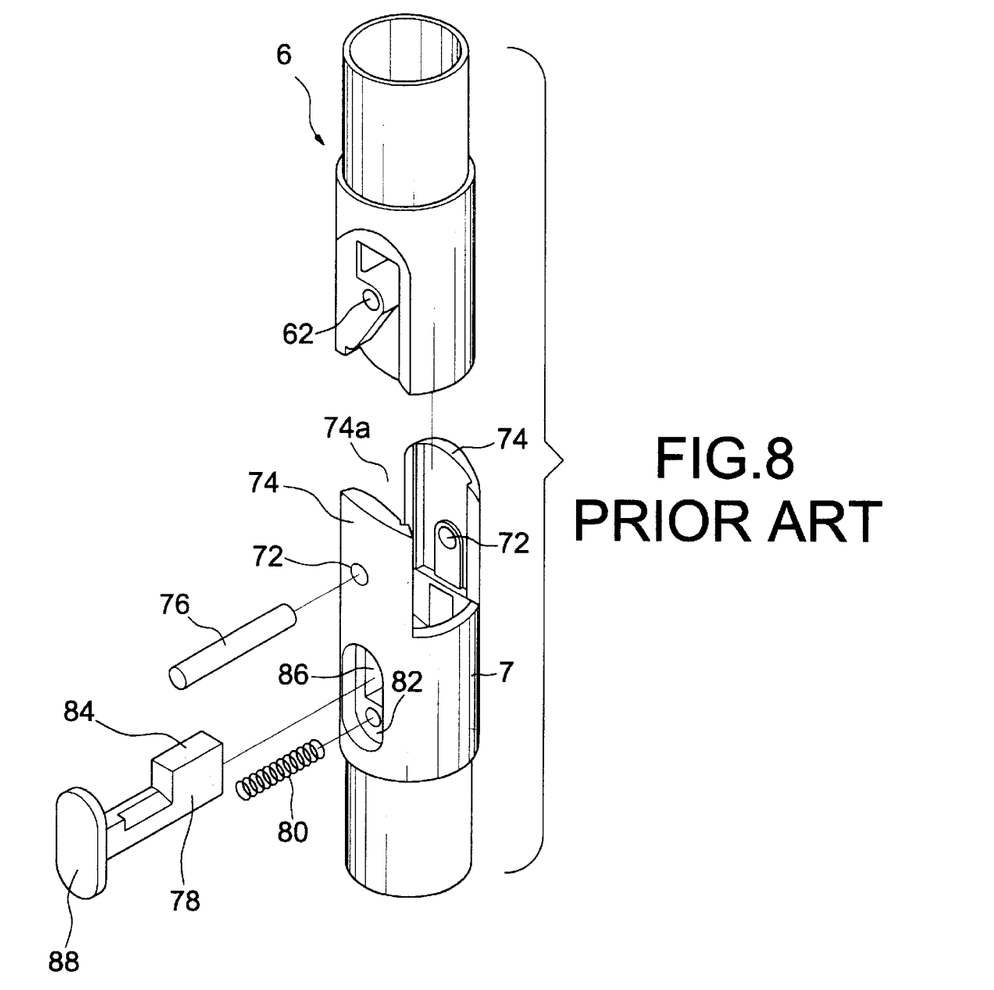
FIG. 8 is an exploded perspective view of a conventional tilt device of a sunshade.
Figure 9:
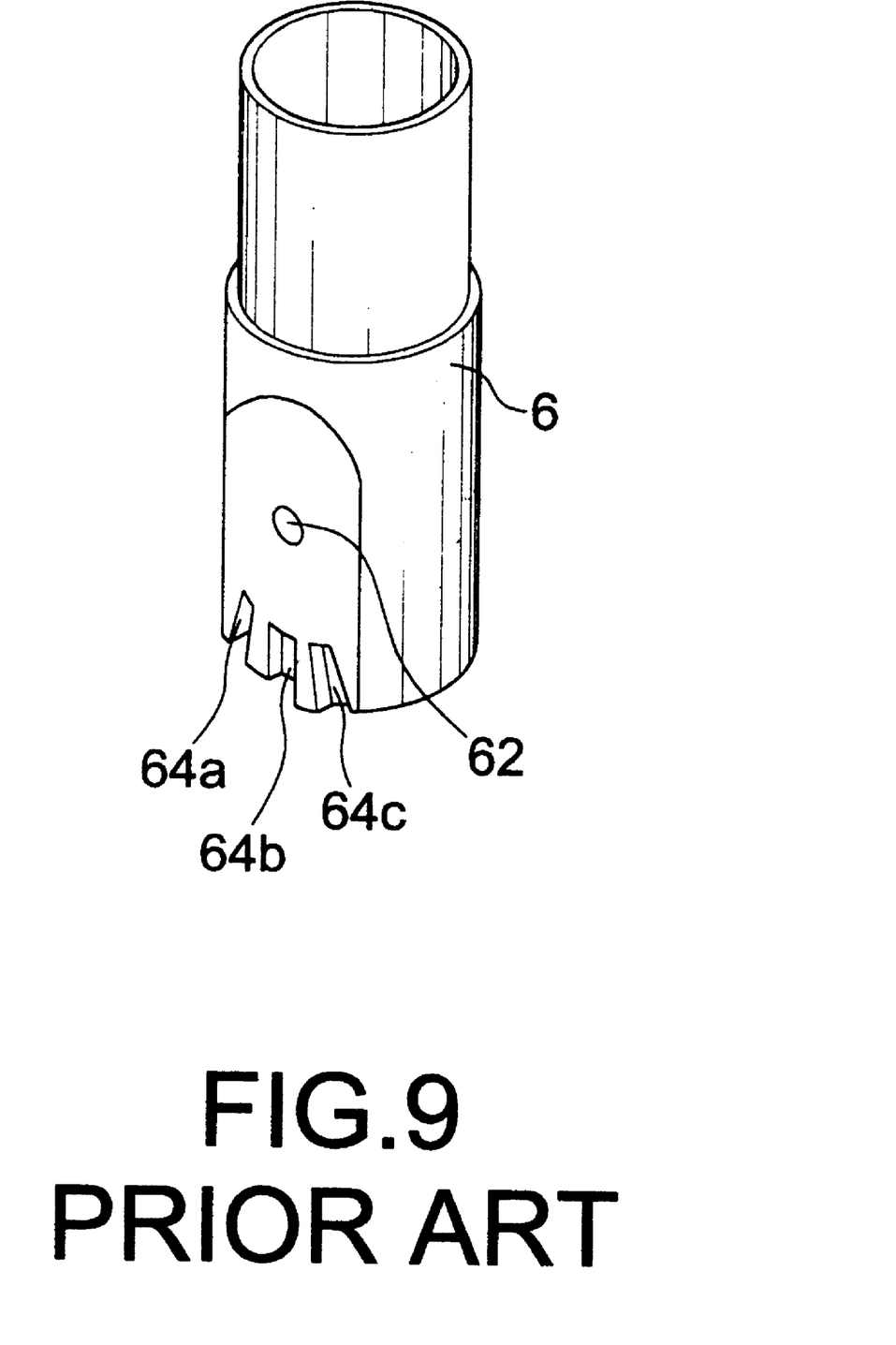
FIG. 9 is a perspective view of an upper sleeve of the tilt device in FIG. 8, illustrating structure of the other side of the upper sleeve.

FIG. 8 of the drawings illustrates a tilt device for a sunshade. The tilt device includes a lower sleeve 7 having a lower end engaged with a lower support tube (not shown) of a sunshade (not shown) and an upper sleeve 6 having an upper end engaged with an upper support tube (not shown) of the sunshade. A canopy (not shown) is attached to the upper support frame. The lower sleeve 7 includes two longitudinal wings 74 extending upward from an upper end thereof, thereby defining a space 74a allowing pivotal movement of a lower end of the upper sleeve 6. The lower sleeve 7 further includes a transverse hole 86 having a countersink 82 in an end thereof. A push member 78 extends through the transverse hole 86 with an enlarged head 88 resting in the countersink 82. The upper sleeve 6 includes a pin hole 62, and a pin 76 is extended through pin holes 72 in the longitudinal wings 74 and the pin hole 62 of the upper sleeve 6, thereby allowing pivotal movement of the upper sleeve 6 relative to the lower sleeve 7. Three positioning grooves 64a, 64b, and 64c are defined in a side of the lower end of the upper sleeve 6. A spring 80 is mounted in the lower sleeve 7 to bias the push member 78 outward, thereby urging an engaging portion 84 on the push member 78 to selectively engage with one of the positioning grooves 64a, 64b, and 64c. The upper sleeve 6 and the canopy are thus retained in an upright position or a tilt position relative to the lower sleeve 7. When the enlarged head 88 of the push member 78 is pushed inward, the spring 80 is compressed and the engaging portion 84 of the push member 78 is disengaged from the positioning grooves 64a, 64b, and 64c. The upper sleeve 6 may be pivoted to another position and the push member 78 is then released to engage the engaging portion 84 with another positioning groove under the action of the spring 80. Thus, the canopy can be retained in another tilt position relative to the lower post of the sunshade.

Nevertheless, the engagement between the engaging portion 84 and the positioning groove 64a, 64b, 64c is not strong, since the positioning groove 64a, 64b, 64c is shallow and faces outward not downward. As a result, the engaging portion 84 or a separation wall between each two adjacent positioning grooves tends to break when the canopy is subjected to strong wing.

SUMMARY OF THE INVENTION

It is an object of the present invention to provide an improved sunshade that can be adjusted to be reliably retained in one of a plurality of tilt positions.

A tilt device for a sunshade in accordance with the present invention comprises:

an upper sleeve having an upper end adapted to be securely connected to an upper end of an upper support tube of a sunshade and a lower end, the lower end of the upper sleeve comprising a plurality of positioning grooves;

a lower sleeve having a lower end adapted to be securely connected to a lower end of a lower support tube of the sunshade, two spaced longitudinal wings extending upward from the upper end of the lower sleeve, the lower end of the upper sleeve being pivotally connected between the longitudinal wings, a first opening being defined in the lower sleeve, a second opening being defined in the lower sleeve and opposite to the first opening;

a push member including a stem having a first end located in the first opening and a second end located in the second opening, the stem being biased to selectively engage with one of the positioning grooves of the upper sleeve;

wherein a peripheral wall defining the first opening and the first end of the stem are so configured that the stem moves downward and inward when the first end of the stem is pushed inward.

In an embodiment of the invention, the first end of the stem includes an enlarged head formed thereon. The first opening is located below one of the longitudinal walls and the second opening is located below the other longitudinal wall. The peripheral wall defining the first opening includes an outwardly facing first inclined surface. The enlarged head includes an inwardly facing second inclined surface in sliding engagement with the outwardly facing first inclined surface, such that the stem is moved inward and downward when the enlarged head is pushed inward. The outwardly facing first inclined surface is above first opening and faces downward. A peripheral wall defining the second opening includes an inwardly facing third inclined surface and the second end of the stem includes a fourth inclined surface in sliding engagement with the inwardly facing third inclined surface. Two transverse walls are connected between two opposite inner wall portions of the lower sleeve, the transverse walls defining a track for receiving the stem of the push member and guiding transverse movement of the push member relative to the lower sleeve. One of the positioning grooves of the upper sleeve that engages with the stem faces downward when the former is engaged with the latter. The stem comprises a stop formed thereon to prevent disengagement of the push member from the lower sleeve.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
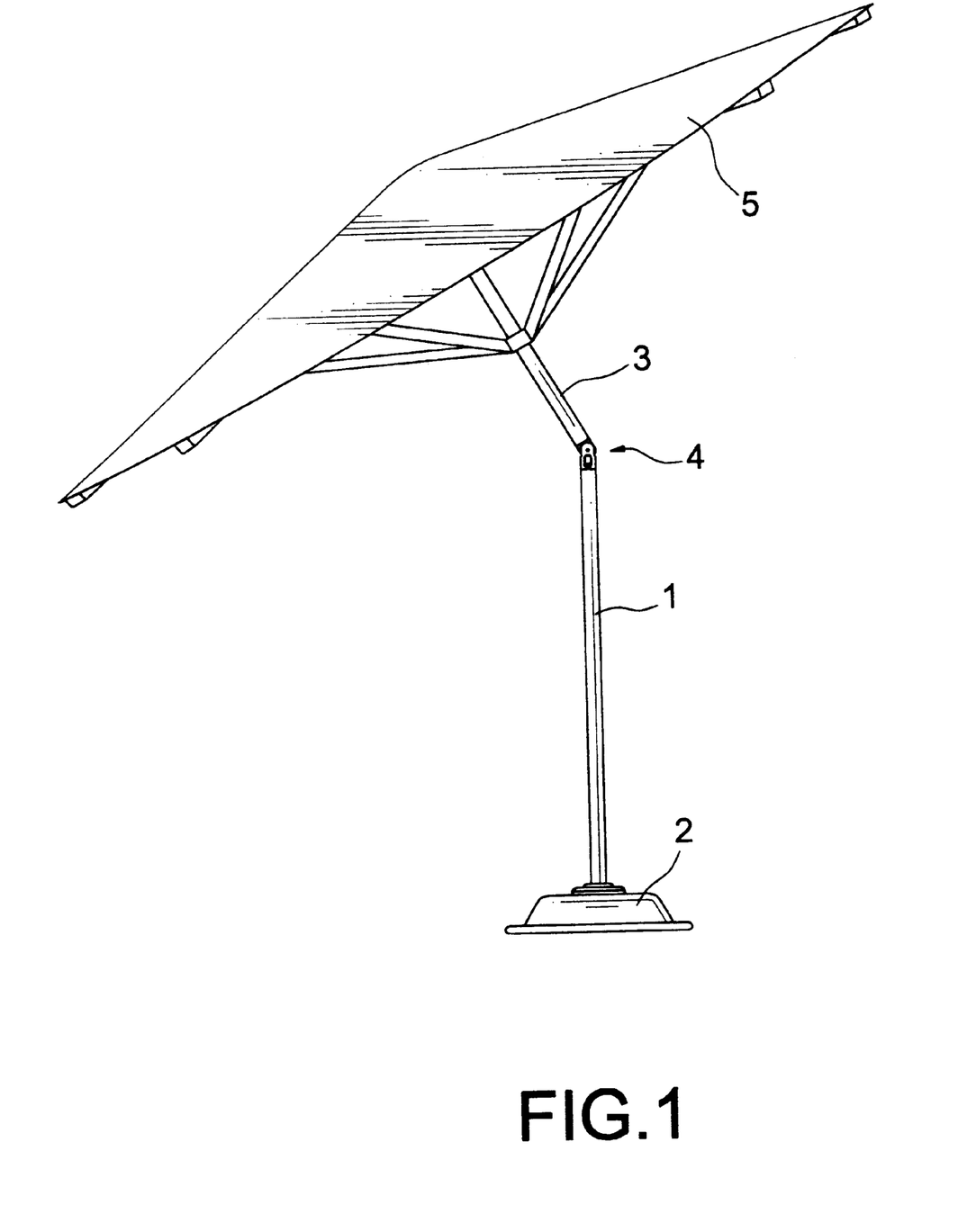
FIG. 1 is a perspective view of a sunshade with a tilt device in accordance with the present invention.

Referring to FIGS. 1 through 7 and initially to FIG. 1, a sunshade in accordance with the present invention generally includes a base 2, a lower support tube 1 extending upright from the base 2, an upper support tube 3, a canopy 5 mounted to the upper support tube 3, and a tilt device 4 mounted between a lower end of the upper support tube 3 and an upper end of the lower support tube 1.

Figure 2:
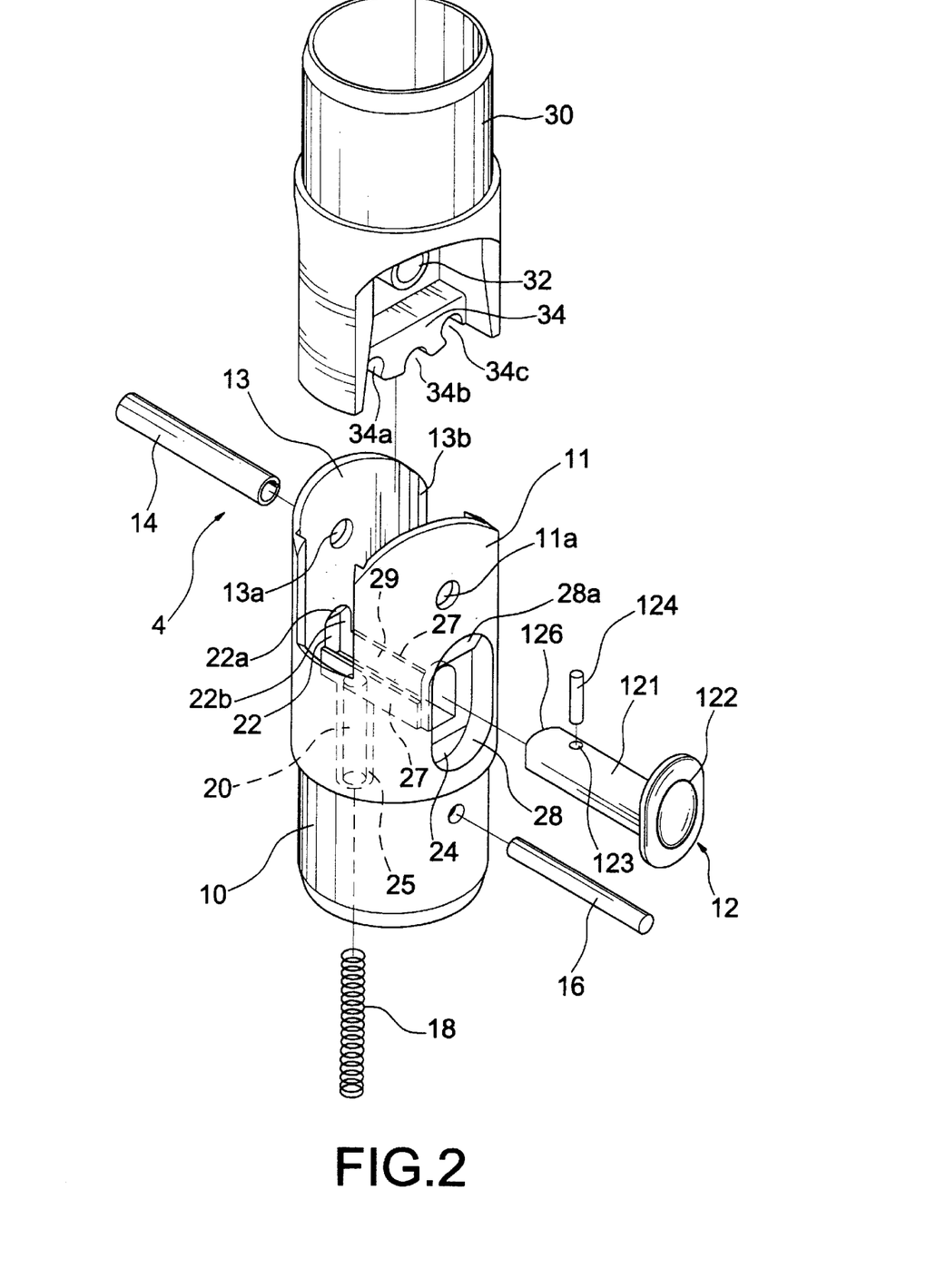
FIG. 2 is an exploded perspective view of the tilt device in accordance with the present invention.
Figure 3:
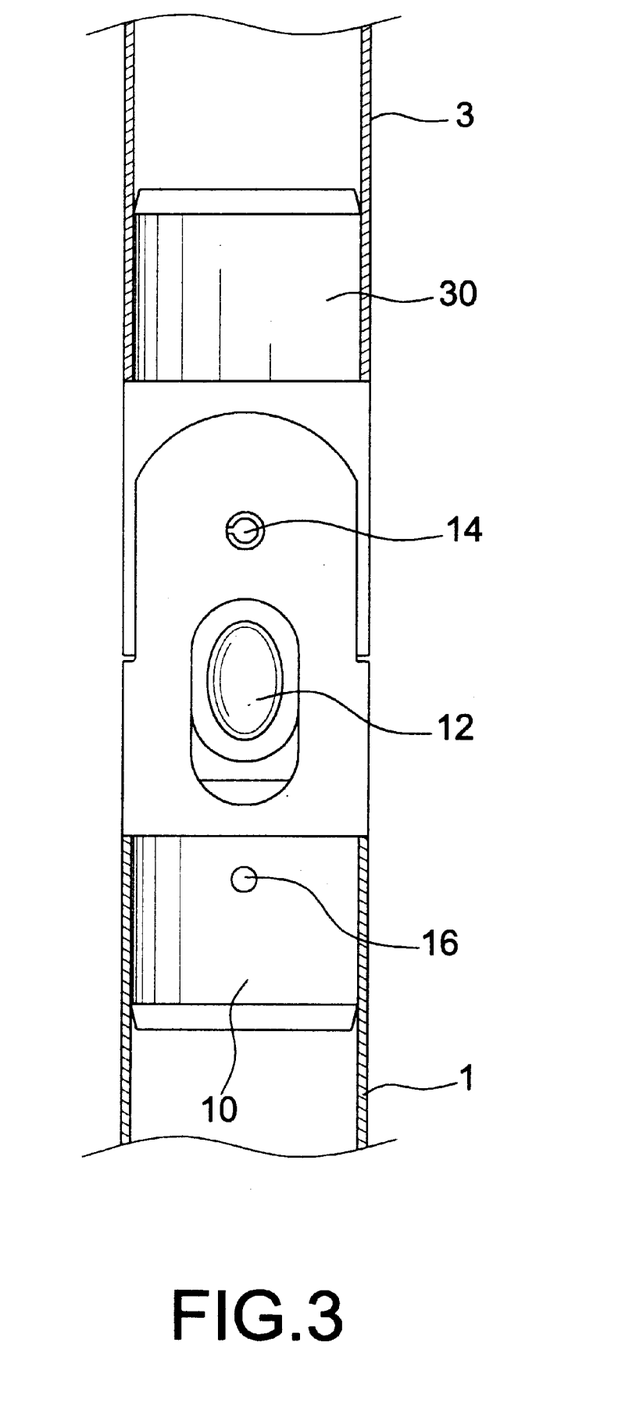
FIG. 3 is a side view, partly sectioned, of a portion of the sunshade in accordance with the present invention.

Referring to FIGS. 2 and 3, the tilt device 4 comprises a lower sleeve 10 having a lower end securely connected to the upper end of the lower support tube 1 and an upper sleeve 30 having an upper end securely connected to the lower end of the upper support tube 3. The upper sleeve 30 further includes a pin hole 32 and an engaging portion 34 having a plurality of positioning grooves 34a, 34b, and 34c.

The lower sleeve 10 includes two longitudinal wings 11 and 13 extending upward from an upper end thereof The longitudinal wings 11 and 13 have a space 13b therebetween to allow pivotal movement of the lower end of the upper sleeve 30 relative to the lower sleeve 10. In this embodiment, a pin 14 is extended through pin holes 13a and 11a in the longitudinal wings 11 and 13 and the pin hole 32 of the upper sleeve 30. A first opening 24 is defined in the upper end of the lower sleeve 10 and located below the longitudinal wing 11. A peripheral wall 28 defining the first opening 24 includes an inclined surface 28a that faces outside. In this embodiment, the inclined surface 28a is above the first opening 24 and inclines downward. A second opening 22 is defined in the upper end of the lower sleeve 10 and located below the longitudinal wing 13. A peripheral wall 22b defining the second opening 22 has an inclined surface 22a that faces inward. In this embodiment, the inclined surface 22a is above the second opening 22 and faces downward.

Figure 5:
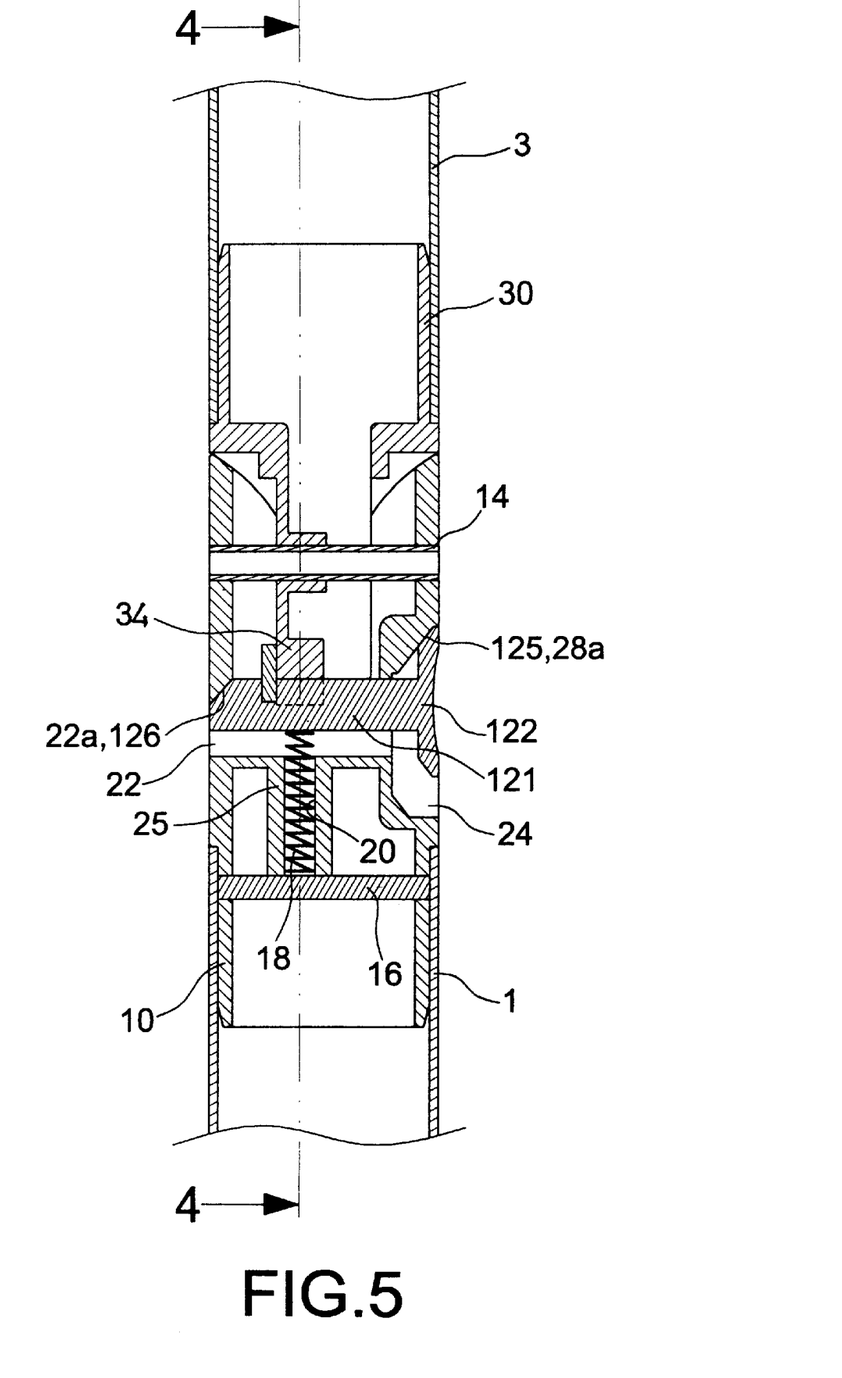
FIG. 5 is a sectional view taken along line 5—5 in FIG. 4.

Two transverse walls 27 are connected between two opposite inner wall portions of the upper end of the lower sleeve 10, thereby defining a track 29 for guiding transverse movement of a push member 12 relative to the lower sleeve 10. The push member 12 includes a stem 121 that extends through and guided by the track 29 defined between the transverse walls 27. An enlarged head 122 is formed on a first end of the stem 121. The enlarged head 122 includes an inclined surface 125 (FIG. 5) for sliding engagement with the inclined surface 28a of the lower sleeve 10. A second end of the stem 121 includes an inclined surface 126 for sliding engagement with the inclined surface 22a of the lower sleeve 10. As illustrated in FIG. 5, the enlarged head 122 of the push member 12 is located in the first opening 24 and the second end of the stem 121 is in the second opening 22. A stop 124 (e.g., in the form of a pin engaged in a hole 123 of the stem 121) is provided on the stem 121 for preventing disengagement of the push member 12 from the lower sleeve 10.

A receiving tube 25 extends downward from lower ends of the transverse walls 27 to define a compartment 20 for receiving an elastic element, such as a spring 18. A bottom end of the receiving tube 25 is enclosed by, e.g., a pin 16 that extends through a pin hole (not labeled) in the lower sleeve 10. Thus, a lower end of the spring 18 rests on the pin 16 and an upper end of the spring 18 is attached to an underside of the stem 121 for biasing an upper side of the stem 121 to selectively engage with one of the positioning grooves 34a, 34b, and 34c which faces downward.

Figure 4:
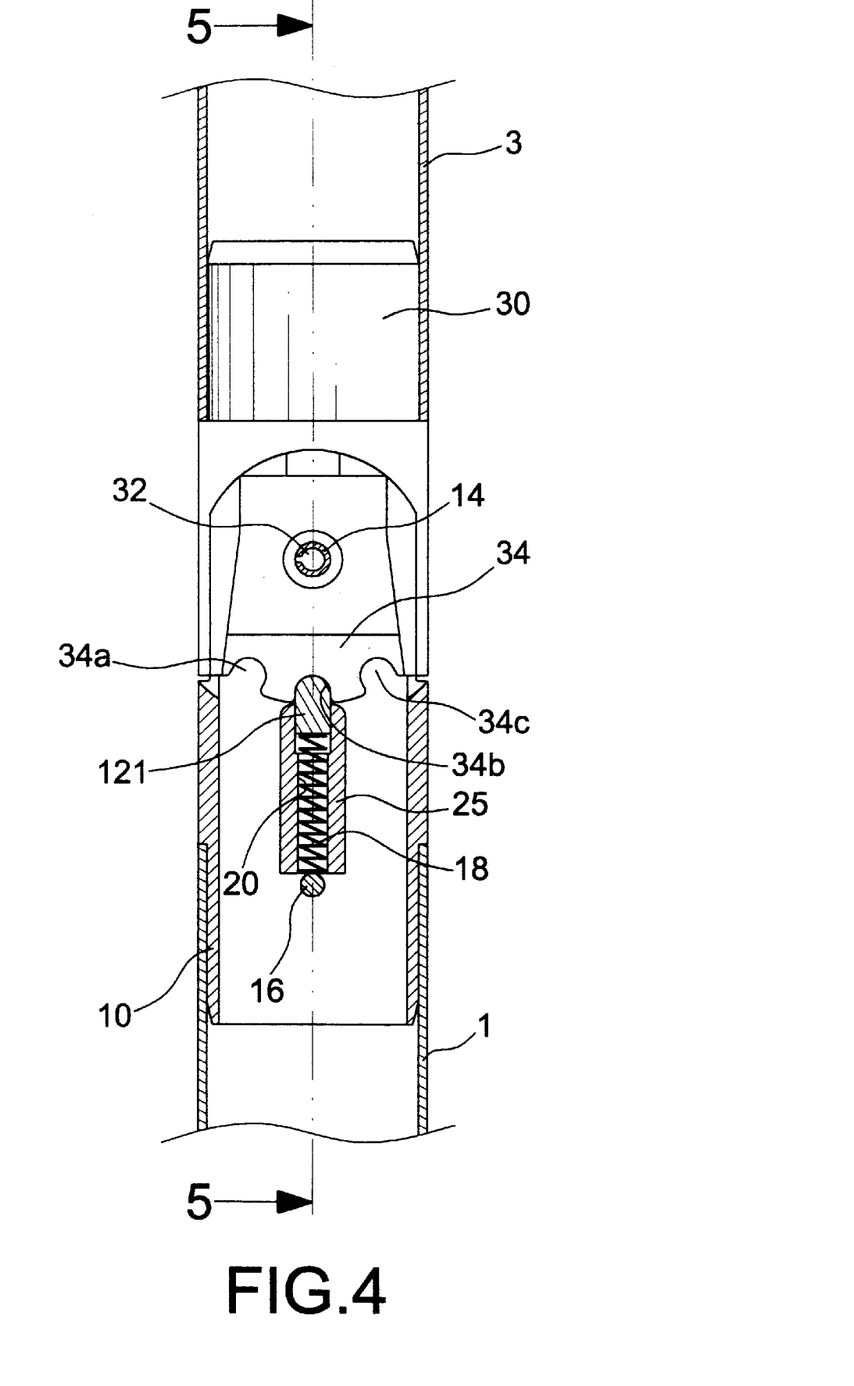
FIG. 4 is a sectional view, taken along line 4—4 in FIG. 5, of the portion of the sunshade in FIG. 3.

Referring to FIGS. 4 and 5, when the upper side of the stem 121 of the push member 12 is engaged in the positioning groove 34b of the upper sleeve 30, the upper sleeve 30 and the upper support tube 3 are retained in an upright position relative to the lower support tube 10. It is noted that the upper side of the stem 121 extends through the positioning groove 34b which faces downward and thus provides a reliable engagement such that the position of the canopy attached to the upper support tube 3 will not be affected even though the canopy 5 is subjected to strong wing.

Figure 6:
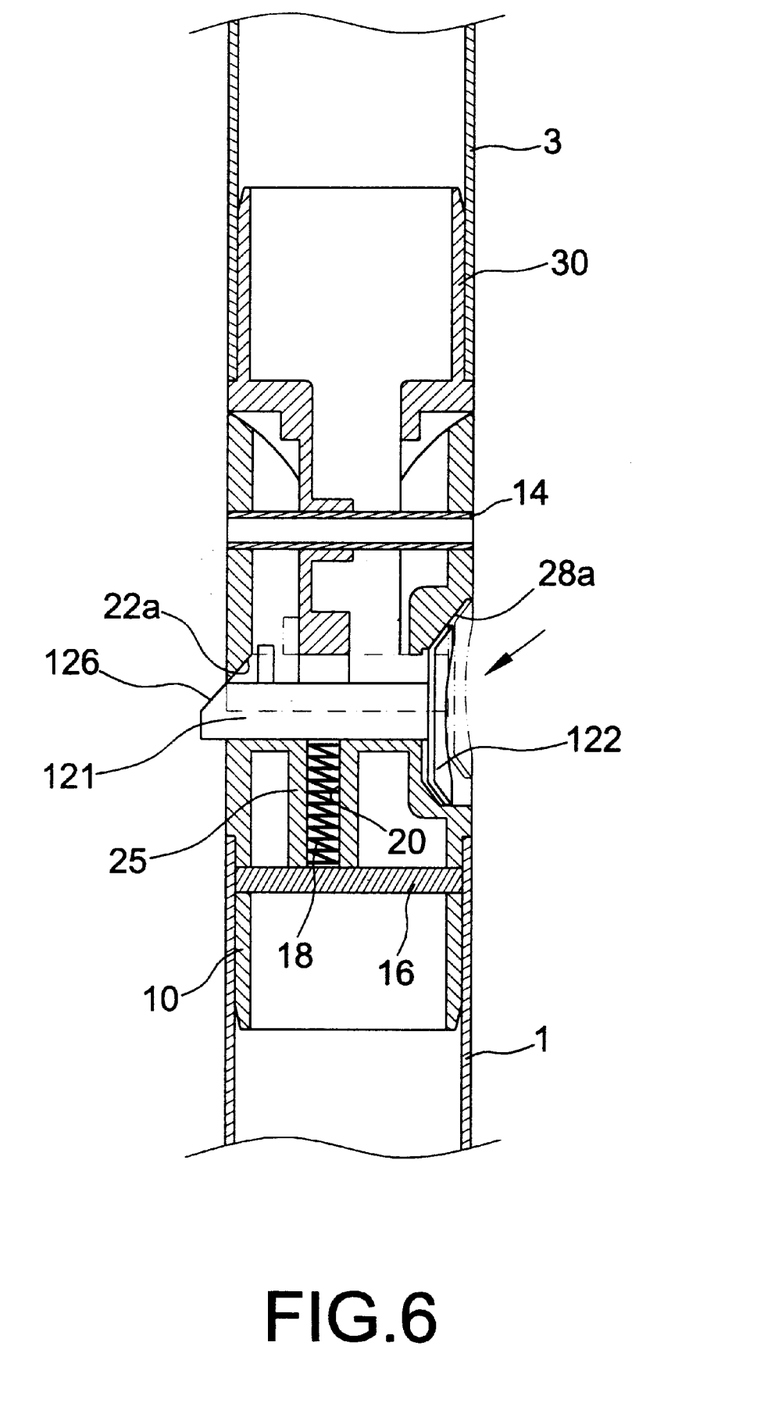
FIG. 6 is a sectional view similar to FIG. 5, wherein a push member is pushed.

Referring to FIG. 6, when the user pushes the enlarged head 122 of the push member 12 inward, the stem 121 also slides downward and thus compresses the spring 18 during its inward movement due to provision of the inclined surfaces 125 and 28a and the inclined surfaces 22a and 126. The stem 121 disengages from the positioning groove 34b and thus allows pivotal movement of the upper sleeve 30 relative to the lower sleeve 10. It is noted that the first opening 24 and the second opening 22 are longer enough to allow vertical movements of the enlarged head 122 of the push member 12 and the second end of the stem 121, respectively.

Figure 7:
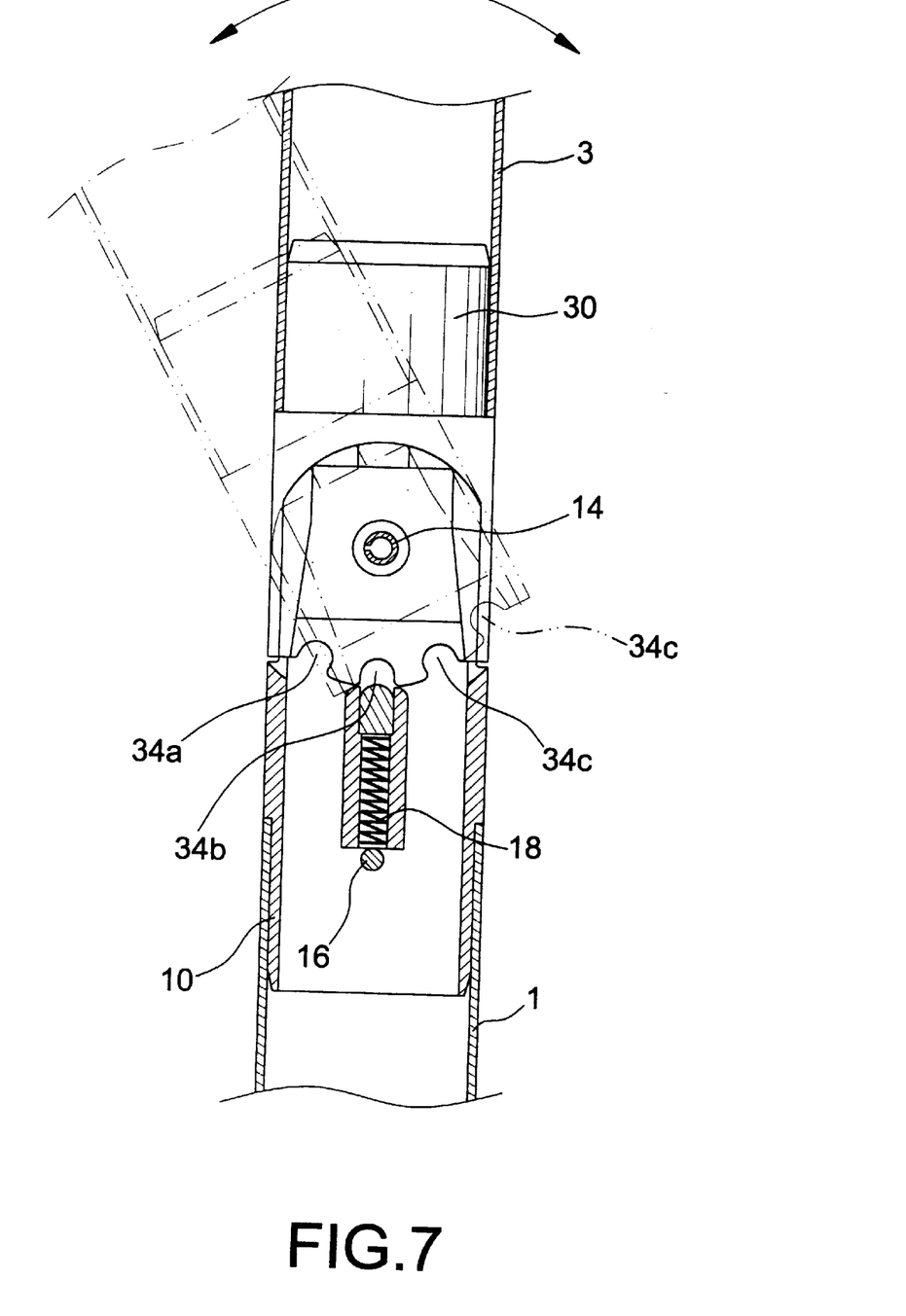
FIG. 7 is a sectional view similar to FIG. 4, illustrating adjustment in tilt angle of the tilt device.

Referring to FIG. 7, the user may pivot the upper sleeve 30 to a desired tilt position (see the phantom lines) relative to the lower sleeve 10 and then releases the push member 12. The upper side of the stem 121 is biased upward by the spring 19 to engage with another positioning groove (e.g., groove 34a) that faces downward now. During the upward movement of the push member 12, the push member 12 also moves outward due to provision of the inclined surfaces 125 and 28a and the inclined surfaces 22a and 126. Namely, the inclined surfaces 125 and 28a and the inclined surfaces 22a and 126 assure stable and smooth movement of the push member 12. Thus, the upper sleeve 30 and the upper support tube 3 are retained in a tilt position relative to the lower support tube 1.

It is appreciated that the user may use only one finger (e.g., the thumb) to push the push member inward to achieve the tilt adjustment. It is noted that the number of the positioning grooves 34a–34c can be varied according to design. In addition, the engaging strength between the push member and the associated positioning groove is stronger, as the associated positioning groove of the upper sleeve that engages with the push member faces downward for secure engagement.

Although the invention has been explained in relation to its preferred embodiment, it is to be understood that many other possible modifications and variations can be made without departing from the scope of the invention as hereinafter claimed.

What is claimed is:

1. A tilt device for a sunshade, the tilt device comprising:
an upper sleeve having an upper end adapted to be securely connected to an upper end of an upper support tube of a sunshade and a lower end, the lower end of the upper sleeve comprising a plurality of positioning grooves;
a lower sleeve having a lower end adapted to be securely connected to a lower end of a lower support tube of the sunshade, two spaced longitudinal wings extending upward from the upper end of the lower sleeve, the lower end of the upper sleeve being pivotally connected between the longitudinal wings, a first opening being defined in the lower sleeve, a second opening being defined in the lower sleeve and opposite to the first opening;
a push member including a stem having a first end located in the first opening and a second end located in the second opening, the stem being biased to selectively engage with one of the positioning grooves of the upper sleeve;
wherein a peripheral wall defining the first opening and the first end of the stem are so configured that the stem moves downward and inward when the first end of the stem is pushed inward.

2. The tilt device as claimed in claim 1, wherein the first end of the stem includes an enlarged head formed thereon.

3. The tilt device as claimed in claim 1, wherein the peripheral wall defining the first opening includes an outwardly facing first inclined surface and the enlarged head includes an inwardly facing second inclined surface in sliding engagement with the outwardly facing first inclined surface, such that the stem is moved inward and downward when the enlarged head is pushed inward.

4. The tilt device as claimed in claim 3, wherein the outwardly facing first inclined surface is above said first opening and faces downward.

5. The tilt device as claimed in claim 3, wherein a peripheral wall defining the second opening includes an inwardly facing third inclined surface and the second end of the stem includes a fourth inclined surface in sliding engagement with the inwardly facing third inclined surface.

6. The tilt device as claimed in claim 1, further comprising two transverse walls connected between two opposite inner wall portions of the lower sleeve, the transverse walls defining a track for receiving the stem of the push member and guiding transverse movement of the push member relative to the lower sleeve.

7. The tilt device as claimed in claim 1, wherein one of the positioning grooves of the upper sleeve that engages with the stem faces downward when the former is engaged with the latter.

8. The tilt device as claimed in claim 1, wherein the stem comprises a stop formed thereon to prevent disengagement of the push member from the lower sleeve.

9. The tilt device as claimed in claim 1, wherein the first opening is located below one of the longitudinal walls and the second opening is located below the other longitudinal wall.

* * * * *